Jan. 22, 1957  G. B. LONG  2,778,613
COOKING VESSEL WITH STIRRER
Filed May 21, 1953  2 Sheets-Sheet 1

INVENTOR.
George B. Long
BY
His Attorney

Jan. 22, 1957    G. B. LONG    2,778,613
COOKING VESSEL WITH STIRRER
Filed May 21, 1953    2 Sheets-Sheet 2

INVENTOR.
George B. Long
BY
His Attorney

United States Patent Office 2,778,613
Patented Jan. 22, 1957

2,778,613

COOKING VESSEL WITH STIRRER

George B. Long, Dayton, Ohio, assignor to General Motors Corporation, Detroit, Mich., a corporation of Delaware Application May 21, 1953, Serial No. 356,573

4 Claims. (Cl. 259—122)

This invention relates to domestic appliances and more particularly to a cooking vessel, such as a deep-well cooker, having a cover provided with a detachable stirring device on the inner side of said cover for use in popping corn, or other cooking operations.

An object of this invention is to provide a combined deep-well cooker and corn popper, the cooker being adapted to fit in the deep-well of a range, and provided with a movable cover which has detachably secured thereto a stirring device on the inner side of said cover, for use in popping corn or other cooking operations.

Another object of this invention is to provide a cooking vessel provided with a cover and a stirring device secured to the inner side of the cover.

Another object of this invention is to provide a cooking vessel with a cover having a handle on the outer side of the cover held by fasteners with heads on the inner side of the cover, which fasteners pass through the cover into the handle to secure it to the cover, and a stirring device detachably secured to the fasteners.

Further objects and advantages of the present invention will be apparent from the following description, reference being had to the accompanying drawings wherein a preferred form of the invention is clearly shown.

Figure 1:
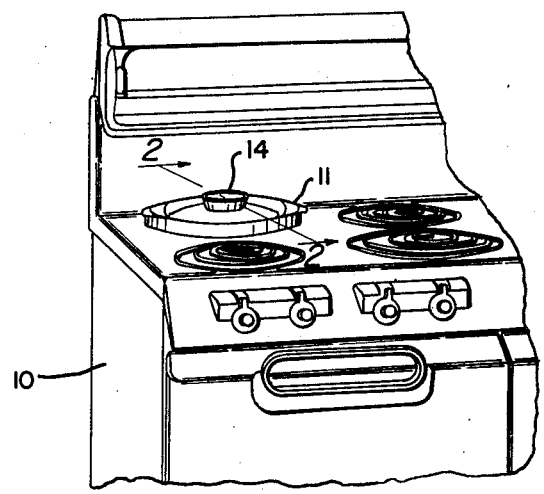
Figure 1 is a perspective view of a range provided with the deep-well cooker and corn popper.

A range 10 may be provided with a cooking vessel or combined deep-well cooker and corn popper 11 which is provided with a cover 12 and a stirring device 13 for stirring the corn detachably secured to the inner side of the cover 12. In some details, the vessel 11 may be similar to the deep-well cookers provided in electric ranges.

The cover 12 is provided with a handle 14, preferably in the shape of a ring, secured to the outer side of the cover 12. Securing means in the form of fasteners or screws 15 have heads 16 on the inner side of the cover and pass through the cover and into the ring 14, for securing the ring handle to the cover. The stirring device is detachably secured to the inner side of the cover, preferably by the heads 16.

Figure 5:
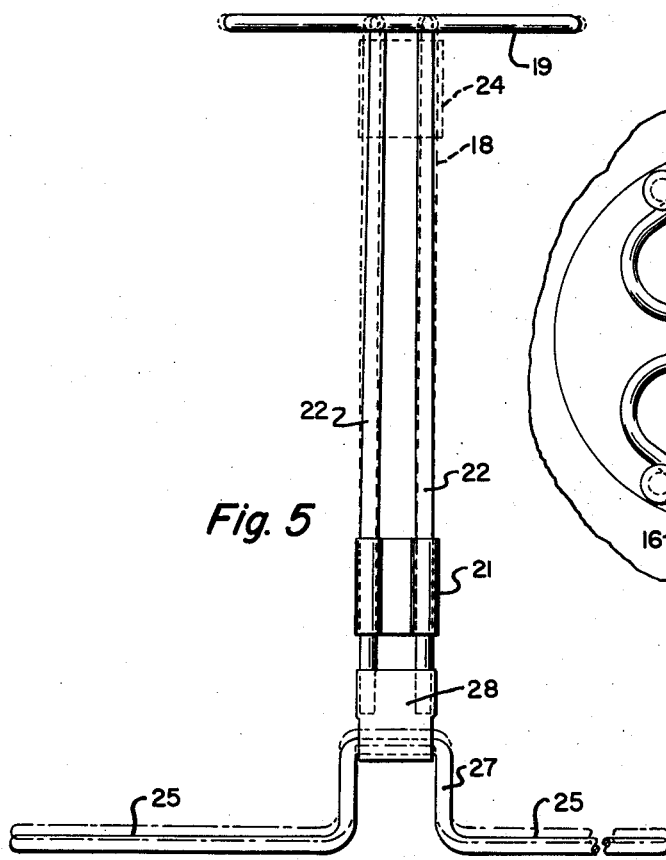
Figure 5 is a vertical elevation of the stirring device on the same scale as Figure 4.
Figure 4:
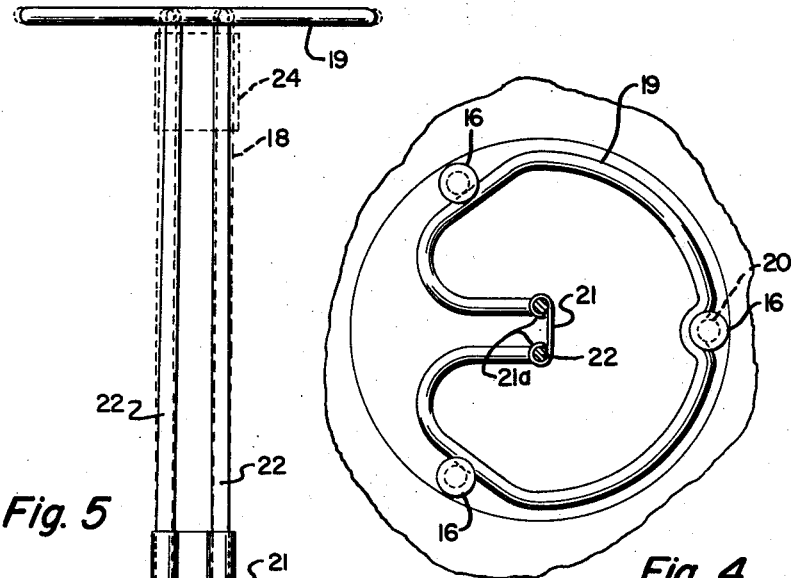
Figure 4 is a further enlargement of a cross-section taken along the line 4—4 of Figure 2.

The stirring device 13 preferably is made of wire, which has a bending action as indicated by the dotted lines 18 in Figure 5. Preferably this bending action is outward in the upper part of the stirring device, so that an upper ring-like portion 19 spreads outwardly into the grooves 20 on the heads 16.

A sliding key 21 is provided on the stirring device 13, which can slide vertically on the two vertical columns 22 of the stirring device to produce an outward bending action in the ring-like portion 19 and in the upper portions of columns 22, when the key is in the upper position 24, as indicated in dotted lines in Figure 5. An inherent resilient inward movement of these parts is permitted when the key is in the lower position, as indicated by full lines in Figure 5. The key 21 has its ends 21a curled loosely around the two vertical columns 22 to produce the outward bending action above referred to. By this construction, the user can quickly attach or detach the stirring device 13 to the cover 12 by sliding the key 21 up or down.

Preferably the stirring device has a lower extension in the form of stirring loops or outward extensions 25 which are adapted to rest lightly on the bottom of the vessel 11.

If desired, the cooking vessel may be provided with grooves 26, which cooperate with the stirring device 13 in producing a more effective stirring action.

Figure 2:
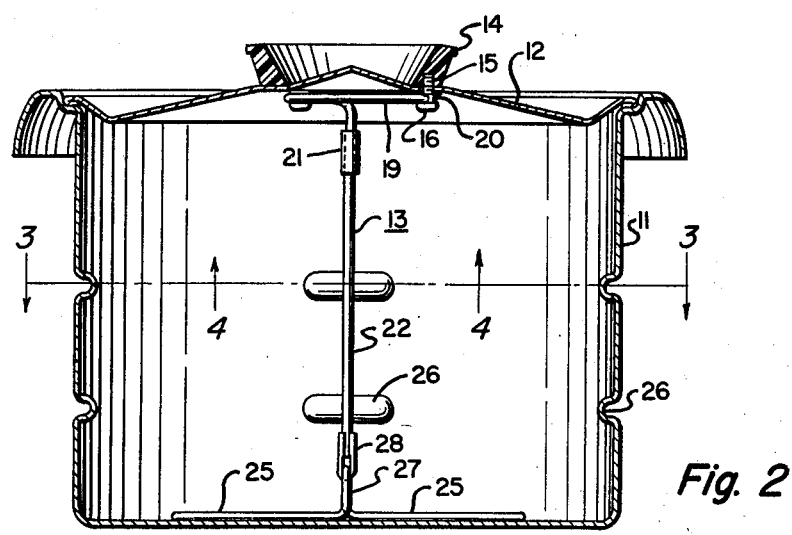
Figure 2 is an enlarged vertical cross-section taken along the line 2—2 of Figure 1.
Figure 3:
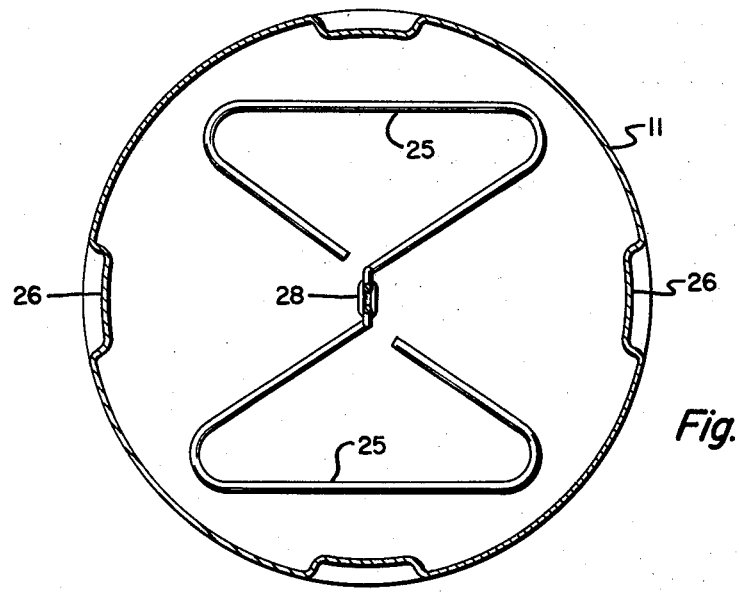
Figure 3 is a horizontal cross-section taken along the line 3—3 of Figure 2.

If desired, a slight play may be provided between the section having the loops 25 and the remainder of the stirring device. To this end, the loops 25 are joined together by the upward bend 27 which is loosely supported in the U-shaped clamp 28 to provide a slight vertical and swinging play between the loops 25 and the remainder of the stirring device 13. The clamp 28 is rigidly secured to the vertical columns 22. By this construction, the loops 25 are permitted to ride lightly on the bottom of vessel 11 even when the cover is not tight on the rim of the vessel. In Figure 2, the loops 25 are shown in a slightly raised position, while in Figure 5 the upper position of the loops 25 is indicated by dotted lines.

In operation, the stirring device 13 may be detached from the cover by moving the key 21 to its lower position, and thereafter the cooker may be used in the same manner as any other cooker. When it is desired to pop corn or to use the vessel in any other cooking operation requiring a stirring action, the stirring device 13 may be attached to the inner side of the cover, by placing the circular part 19 of the stirring device inside of the heads 16, and thereafter upwardly sliding the key 21 to its upper position 24 (Figure 5) to lock the stirring device in the grooves 20 of the heads 16 by the outward bending action which causes the loop 19 to spread out into the grooves 20 of the heads 16. Thereafter, the corn popping operation may be started in the vessel 11. When a stirring action is necessary, the user may grasp the handle 14 and rotate and/or vertically move the cover 12 to produce the required stirring action inside of the vessel 11.

While the invention herein described has been indicated to be particularly useful when used in connection with a deep-well of a range, and for the purpose of popping corn, it is understood that many advantages of this invention are applicable to any cooking vessel, not necessarily for use in a deep-well, and for many cooking operations requiring a stirring action, not necessarily in connection with popping of corn.

While the form of embodiment of the invention as herein disclosed constitutes a preferred form, it is to be understood that other forms might be adopted as may come within the scope of the claims which follow.

What is claimed is as follows:

1. In combination: a cooking vessel; a cover for said vessel; a handle on the outer side of said cover; fasteners for said handle with heads on the inner side of said cover; a stirring device including a wire structure having wire portions engageable with said heads; and a sliding key on said stirring device to move and detachably lock said wire portions of said stirring device to said heads.

2. In combination: a cooking vessel; a cover for said vessel; a ring forming a handle on the outer side of said cover; fasteners with heads on the inner side of said cover and passing through said cover into said ring to secure said ring to said cover; a stirring device including a wire structure having wire portions engageable with said heads; and a sliding key on said stirring device to move and detachably lock said wire portions of said stirring device to said heads.

3. In combination: a cooking vessel; a cover for said vessel; a ring forming a handle on the outer side of said cover; fasteners with heads on the inner side of said cover and passing through said cover into said ring to secure said ring to said cover; a stirring device including a wire structure having wire portions engageable with said heads by outward movement of said wire portions; and a sliding key on said stirring device outwardly to spread and lock said wire portions, and inwardly to contract and release said wire portions from said heads.

4. In combination: a cooking vessel; a cover for said vessel; a ring forming a handle on the outer side of said cover; fasteners with heads having grooves on the inner side of said cover, said fasteners passing through said cover and into said ring to secure said ring to said cover; a stirring device including a wire structure having wire portions movable into and out of said grooves; and a sliding key on said stirring device to move said wire portion into said grooves to lock said stirring device to said cover, and to move said wire portions out of said grooves to release said device from said cover.

References Cited in the file of this patent
UNITED STATES PATENTS

| | | |
|---|---|---|
| 700,534 | Moller | May 20, 1902 |
| 1,019,448 | Freeman | Mar. 5, 1912 |
| 1,221,640 | Wiklund et al. | Apr. 3, 1917 |
| 1,466,721 | Hunter | Sept. 4, 1923 |
| 1,620,765 | Jackson | Mar. 15, 1927 |
| 2,034,214 | Smith | Mar. 17, 1936 |